United States Patent
Alexander et al.

(10) Patent No.: US 9,471,454 B2
(45) Date of Patent: Oct. 18, 2016

(54) PERFORMING AUTOMATED SYSTEM TESTS

(71) Applicant: International Business Machines Corporation, Armonk, NY (US)

(72) Inventors: Stefan Alexander, Boeblingen (DE); Frank Lautenbach, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 14/248,697

(22) Filed: Apr. 9, 2014

(65) Prior Publication Data

US 2014/0304556 A1   Oct. 9, 2014

(30) Foreign Application Priority Data

Apr. 9, 2013  (GB) .................................. 1306399.5

(51) Int. Cl.
*G06F 11/00*  (2006.01)
*G06F 11/263*  (2006.01)

(52) U.S. Cl.
CPC ................................ *G06F 11/2635* (2013.01)

(58) Field of Classification Search
CPC ........................... G06F 11/36–11/3696; G06F 11/263–11/2635
See application file for complete search history.

(56) References Cited

U.S. PATENT DOCUMENTS

| | | | |
|---|---|---|---|
| 6,349,393 B1 | 2/2002 | Cox | |
| 7,873,945 B2 | 1/2011 | Musuvathi et al. | |
| 2002/0178402 A1 | 11/2002 | Tsai | |
| 2003/0163770 A1 | 8/2003 | Webster et al. | |
| 2007/0038898 A1* | 2/2007 | Clee .................... | G06F 11/3688 714/38.1 |
| 2007/0061781 A1 | 3/2007 | Bryan | |
| 2007/0094541 A1 | 4/2007 | Kang | |
| 2009/0254887 A1* | 10/2009 | Rossi .................. | G06F 11/3688 717/126 |
| 2009/0265681 A1* | 10/2009 | Beto .................... | G06F 11/3688 717/100 |
| 2011/0054841 A1 | 3/2011 | Wang | |
| 2011/0145653 A1 | 6/2011 | Broadfoot et al. | |
| 2011/0252279 A1 | 10/2011 | Bacher et al. | |
| 2012/0266023 A1 | 10/2012 | Brown et al. | |
| 2013/0174125 A1* | 7/2013 | Trim .................... | G06F 11/3664 717/124 |

OTHER PUBLICATIONS

Bao et al., "Test Case Generation Using Model Checking for Software Components Deployed into New Environments," Proceedings of the 2009 International Conference on Software Testing, Verification and Validation Workshops (ICSTW'09), Apr. 2009, pp. 57-66. Garg et al., "When to stop testing: A study from the perspective of software reliability models," IET Software, vol. 5, No. 3, Jun. 2011, pp. 263-273.
UK Intellectual Property Office Search Report, dated Oct. 16, 2013, regarding Application No. GB1306399.5, 3 pages.

* cited by examiner

*Primary Examiner* — Jason Bryan
(74) *Attorney, Agent, or Firm* — Yee & Associates, P.C.; Richard A. Wilhelm

(57) ABSTRACT

A method, system and program product for performing automated tests on a system under test. A set of test blocks is provided, with each test block triggering at least one user activity on the system under test. The following is performed iteratively to execute multiple test blocks consecutively: defining a subset of executable test blocks; scoring the executable test blocks based on at least one scoring parameter; selecting a test block to be executed out of the subset of executable test blocks by randomly selecting a test block based on the scores, where the probability of selection of a test block depends on the score; executing the selected test block; updating the data of the status repository based on data of the system under test; and updating the data of the history log by adding data regarding the executed test block and the results of the test block execution.

15 Claims, 4 Drawing Sheets

PERFORMING AUTOMATED SYSTEM TESTS

This application is a counterpart of and claims the benefit of priority to United Kingdom Patent Office Application Serial No. GB1306399.5, filed on Apr. 9, 2013, the contents of which are hereby incorporated by reference.

FIELD OF THE INVENTION

The present invention relates generally to the field of system testing. More specifically, the present invention is related to a method and system for performing automated tests on a system under test.

BACKGROUND

System testing checks whether the system under test operates as intended or not. When the system under test does not operate as intended, yielding unexpected results, this is due to defects in the system or the system's software. The correction of these defects, and the introduction of new features or the enhancement of existing features, may introduce new defects into the system under test. Repeated testing improves the likelihood of catching defects soon after their introduction.

In general, there are two testing approaches with mutually exclusive advantages, namely, manual testing and automated testing. The strength of manual testing, especially in complex software environments, is that the software is used from the customer's point of view and with a customer-like behavior thereby executing an arbitrary sequence of activities and inputs. Due to manual testing the state of the system under test is non-deterministic, e.g. due to user errors. Thus, the system under test might get into a system state that has not yet been considered. In addition, long term effects might be detected across the complete set of system features and belonging to totally different system blocks.

In contrast thereto, automated testing shows other advantages. Automated testing is less resource intensive than manual testing because no human test person is needed. In addition, occurring failures are deterministically reproducible because of the well-defined run of the test routine. Finally, automated testing is much faster, i.e., a higher coverage of testing is reached in a certain period of time.

Known solutions and tools essentially are focused on automated test execution. By that, these solutions provide the advantages of automated testing as described above but do negate the benefits of manual test execution. Hence, once manual test scenarios get automated, most of the mentioned advantages of manual testing are lost because the user-specific randomness is eliminated by using a deterministic test environment. In addition, most automated tests do not focus on long-term effects and do not reflect stochastical aspects of human user activities.

Therefore, it would be advantageous to have a mechanism for system testing which combines the advantages of manual and automated testing in order to improve the quality and error detection of automated system testing.

SUMMARY

It is an objective of embodiments of the invention to provide for an improved computer-implemented method, computer-readable medium and system for improving the quality and error detection of automated system testing. The objective is solved by the features of the independent claims. Preferred embodiments are given in the dependent claims. If not explicitly indicated otherwise, embodiments of the invention can be freely combined with each other.

In one aspect, the invention relates to a method for performing automated tests on a system under test, the method comprising the following steps:

- Providing a set of test blocks (TB1-TBn), each test block (TB1-TBn) triggering at least one user activity on the system under test (SUT);
- Providing a status repository (130) containing data reflecting the current status of the system under test (SUT);
- Providing a history log (140) which protocols data regarding the performed automated tests and therefore provides data necessary for tracing the test history;
- wherein the following set of steps is performed iteratively in order to execute a plurality of test blocks (TB1-TBn) consecutively:
- Defining a subset of executable test blocks by evaluating preconditions mandatory for executing the test blocks (TB1-TBn) based on the current status of the system under test (SUT);
- Scoring the executable test blocks based on at least one scoring parameter;
- Selecting a test block (TB1-TBn) to be executed out of the subset of executable test blocks by randomly selecting a test block based on said scores, wherein the probability of selection of a test block depends on said score;
- Executing the selected test block wherein due to the execution at least one action is triggered on the system under test (SUT);
- Updating the data of the status repository (130) based on data of the system under test (SUT) provided by the executed test block; and
- Updating the data of the history log (140) by adding data regarding the executed test block (TB1-TBn) and the results of the test block execution in order to provide a possibility of repeating the automated tests starting at a certain status of the system under test (SUT).

Thereby an enhanced approach for automated, state-based stochastic system testing is presented which combines the advantages of arbitrariness and unpredictability of manual testing with the efficiency of automated testing. By evaluating the set of executable test blocks based on pre-conditions and selecting a test block out of said set of test blocks based on a statistical method a dynamic, random selection and execution of test cases based on the current status of the system under test is obtained.

Because of the non-deterministic order of execution of test blocks and the arbitrariness of the parameters and states of the system under test during the automated test, it is advantageous to implement a test history logging. Said logging may include an indication of already executed test blocks and the order of execution, the respective execution states of all test blocks performed so far, the input and output parameters of said executed test blocks and the state/characteristics of the system under test before and after the execution of a test block. Thereby the ability of completely reproducing a certain failure situation is obtained.

Thus, the history log provides the possibility of repeating the automated test starting at a certain status of the system under test. Thereby, in case of a failure situation it is not only possible to review the logged information, but it is also possible to execute all performed test blocks in exactly the same sequence as they were performed when the error situation occurred. Thereby it is possible to deterministically reproduce previously stochastically explored failure scenarios.

According to preferred embodiments, the status of the status repository is stored in the history log before and/or after the execution of the test block. Thereby it is possible to reconstruct the changes in the status repository caused by a certain test block.

According to preferred embodiments, a test scenario is built up by a set of self-contained test blocks, wherein the sequence of execution of test blocks is influenced by the current status of the system under test. A test scenario may comprise a plurality of user interactions. For emulating a system usage as close to a human usage as possible, each user interaction or a set of user interactions may be implemented as a test block. So each test block may represent said set of user activities as the smallest cohesive unit of steps. By influencing the order of execution of said test blocks based on the status of the system under test, it is possible to reflect a common user activity.

According to preferred embodiments, the sequence of test blocks to be executed is determined in real-time based on data of the status repository reflecting the status of the current system under test modified by the test block execution. Thereby the sequence of execution of test blocks depends not only on the expected but also on the unexpected behavior of the system under test.

According to preferred embodiments, the test blocks are executable independently from each other, if said preconditions mandatory for executing the test blocks are fulfilled. Said preconditions may be information or states produced by earlier performed test blocks. So, not all test blocks contained in the test block repository may be executable anytime but a prior executed test block may establish a system state necessary for executing a following test block.

According to preferred embodiments, the test blocks are associated with at least one weighting factor indicating a relative frequency of the user activity emulated by the test block, wherein the probability of selection of a test block is affected by said weight factor. For example, in a certain test scenario, a first user activity covered by a first test block may appear more often than a second user activity covered by a second test block. To get an automated test close to reality, it might be advantageous to emulate said relative frequency of occurrence. Said weighting factor influences the likelihood of selection of a certain test block and therefore can be used to adjust the relative frequency of occurrence of test blocks as desired.

According to preferred embodiments, after executing a test block the execution is validated using validation criteria associated with the executed test block. Preferably, the executed test block validates itself against success (pass) or exit (fail) criteria and enables therefore an evaluation of the part of the test scenario covered by the respective test block. Thereby a possible failure or bug within the system under test may be explored in close context with the cause of said failure. Preferably, the validation criteria are an integral part of the data of the respective test block.

According to preferred embodiments, also the result of the validation is stored in the history log. Thereby it is possible to reproduce the success or failure of the already executed test blocks and thereby facilitate the localization of the failure.

According to preferred embodiments, a set of test blocks is executed iteratively and cleanup or initialization steps are avoided in-between successive test blocks to enable the testing of long term effects. In contrary to common automated tests no initialization routines are necessary to ensure a clean test environment. Thereby it is possible to explore long term effects across the complete set of features of the system under test.

According to preferred embodiments, the subset of executable test blocks is updated after each test block execution by evaluating the executability of the available test blocks based on the updated data and/or metadata contained in the status repository. Thereby the amount of executable test blocks is changed after each test block execution depending on the current state of the system under test. Thus, the test scenario built up by the actual executable test blocks is adapted according to the current state of the system under test.

According to preferred embodiments, the at least one scoring parameter is a parameter associated with the period of time elapsed since the last execution of the test block and/or a parameter associated with the test block specifying the priority or focus of the test block. Thus, the probability of selection of a test block not used for a longer period of time is higher than the probability of selection of a test block currently executed. The parameter indicating the priority or focus may be used to specify a certain area of application of a test block or certain coverage of aspects of the system under test. If, for example, a code change was made regarding a certain aspect of the system under test, the test blocks may be preferably selected which cover said aspect.

In a further aspect, the invention relates to a system for performing automated tests on a system under test, the system comprising:
  a test block repository (110) providing a set of test blocks (TB1-TBn), each test block (TB1-TBn) triggering at least one user activity on the system under test (SUT);
  a status repository (130) containing data reflecting the current status of the system under test (SUT);
  a history log (140) adapted to protocol data regarding the performed automated tests and therefore adapted for providing data necessary for tracing the test history;
wherein the system is adapted to execute a plurality of test blocks (TB1-TBn) consecutively using:
  means for defining a subset of executable test blocks by evaluating preconditions mandatory for executing the test blocks based on the current status of the system under test (SUT);
  means for scoring the executable test blocks based on at least one scoring parameter;
  means for selecting a test block to be executed out of the subset of executable test blocks by randomly selecting a test block based on said scores, wherein the probability of selection of a test block depends on said score;
  a test block execution unit (120) adapted to execute the selected test block wherein due to the execution at least one action is triggered on the system under test (SUT) and adapted to update the data of the status repository (130) based on data of the system under test (SUT) provided by the executed test block;
  means for updating the data of the history log (140) by adding data regarding the executed test block (TB1-TBn) and the results of the test block execution in order to provide a possibility of repeating the automated tests starting at a certain status of the system under test (SUT).

In a further aspect, the invention relates to a computer-readable medium comprising computer-readable program code embodied therewith which, when executed by a processor, cause the processor to execute a method as previously described.

BRIEF DESCRIPTION OF THE DRAWINGS

In the following, preferred embodiments of the invention will be described in greater detail by way of example, only making reference to the drawings in which.

DETAILED DESCRIPTION

Figure 1:
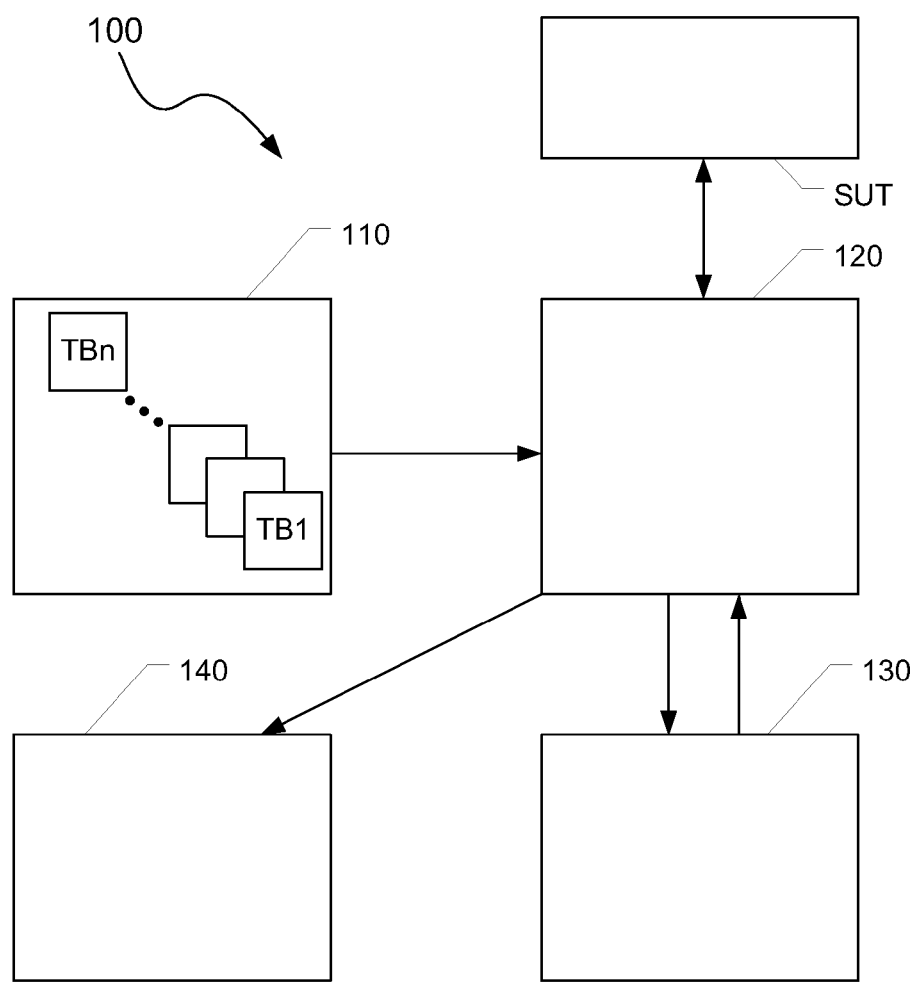
FIG. 1 shows a schematic representation of the automated test system.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Referring to FIG. 1, a schematic diagram of a system 100 for performing an automated system test is shown. The system 100 comprises a test block repository 110, a test block execution unit 120, a status repository 130 and a history log unit 140. The test block execution unit 120 is interacting with the system under test SUT. The system 100 builds as automated test environment for the system under test SUT to test said system SUT as close as possible to the common use, i.e. the system 100 is adapted to emulate "close to customer" usage scenarios. The system under test SUT is the actual system to be verified and/or validated. In a concrete embodiment it might be application software including its operational environment such as the operating system, middleware, other applications or underlying configurations as well as attached other systems or devices. In another embodiment, the system under test SUT might be a complex, software-controlled technical system, wherein the system 100 is interacting with the technical system via an appropriate interface.

The test block repository 110 is configured to store and manage a plurality of test blocks TB1-TBn. Each test block TB1-TBn embodies and/or implements a certain set of activities a user would perform on the system under test SUT as a smallest cohesive unit of steps, e.g. register as a new user for a travel booking system. Thereby, a certain test scenario, e.g. booking a journey on a booking system, may be subdivided in a plurality of smaller steps, wherein each step is emulated by a test block TB1-TBn.

Each test block TB1-TBn is associated with a set of parameters.

There may be pre-conditions specified which have to be met for executing the test block. It is worth mentioning that all test blocks can be executed independently from each other, but there might be dependencies regarding the order of execution. For example, a modification in the booking system may only be performed if there is at least one order within the booking system, i.e. the system under test SUT. By defining pre-conditions it is possible to specify requirements that have to be fulfilled before executing a certain test block TB1-TBn. In other words, not all of the defined test blocks are executable at each point of time. Therefore the test block repository 110 is adapted to determine the executable test blocks out of the whole set of available test blocks.

In addition, the test blocks may comprise at least one parameter influencing the probability of execution of the respective test block, i.e. an individual weight or likelihood factor. The test block repository 110 is adapted to select a test block TB1-TBn out of the actual executable test blocks TB1-TBn randomly. By implementing said weight or likelihood factor it is possible to imitate the typical usage of the system under test SUT. For example, a first test block may implement the reservation of a journey, a second test block may implement its cancellation. In normal use of a booking system the probability of a reservation may be higher than the probability of cancellation. Therefore to get as close as possible to the common usage of the system under test SUT, the weight or likelihood factor of the first test block might be higher than the weight or likelihood factor of the second test block.

Furthermore a test block TB1-TBn may be associated with at least one further parameter or variable, wherein the value of the parameter is not stored within the respective test block but is located within the status repository 130. During execution, the respective test block TB1-TBn may have access to the status repository 130 and therefore access to the value of the parameter stored within said status repository 130. Thus, it is possible to exchange information between subsequently executed test blocks in an indirect and decoupled manner. On the one hand, the test block may log information and states to the status repository 130 for reuse by subsequently executed test blocks and on the other hand, the test block may be able to refer to information and states produced by previously executed test blocks by accessing the status repository 130.

Optionally, the test blocks may comprise at least one further parameter or identifier specifying at least one criterion or defining a certain purpose or objective of the test block. Said parameter or identifier may be checked or scanned during evaluating the readiness of the test block and/or while selecting a certain test block out of the set of test blocks ready for execution. Thereby it is possible to limit the number of test blocks if certain hot spot areas should be evaluated by the automated system testing, e.g. areas addressed by accumulated Problem Management Requests (PMRs), areas addressed by Authorized Program Analysis Reports (APARs) which were opened in the recent past or areas mainly affected by recent code changes.

In addition, test blocks TB1-TBn may comprise a description or specification of corresponding verification points to automatically determine if the execution of the test block was successful or if a failure occurred. In other words, the test blocks are self-validating and contain information regarding the assessment of the result of execution.

As already mentioned, the test block repository 110 is adapted to randomly select a test block TB1-TBn to be executed from the set of executable test blocks. The strategy for selecting the test block to be executed next will be described later on.

The test block repository 110 is connected to the test block execution unit 120 which is adapted to trigger the execution of the selected test block. It is worth mentioning that only one test block is executed by the test block execution unit 120 at a certain point of time. The currently executed test block is interacting with the system under test (SUT), i.e. it is performing concrete actions on the system under test SUT.

In order to evaluate long term effects of the system under test SUT, the test block execution unit 120 does not perform any cleanup or initialization steps between the subsequent executions of a plurality of test blocks. Thereby a realistic usage of the system under test is achieved. In case of a bug within the system under test, the value or behavior resulting of the bug will not be erased due to any cleanup or initialization step but it might propagate and lead to a wrong configured setup of the system under test SUT. The case may occur that all the subsequently executed test blocks will fail or will be not executable any more. As a consequence, the system 100 may enter and signal the state "stalled", i.e. there is an exit-condition to stop the execution of the test environment.

Preferably, the test block execution unit 120 is adapted to perform automatic build upgrades. Build upgrades do mean a replacement of all or a subset of components of the system under test (e.g. executables) without interrupting the overall flow of test executions. Before executing the next test block TB1-TBn, the test block execution unit 120 may check if a newer version of the system under test SUT may be available. If so, the system under test SUT may be upgraded or replaced by an actual version. Thereby upgrades without stopping the test procedures are possible.

As already mentioned, the system 100 may comprise a status repository 130. The status repository 130 is connected to the test block execution unit 120 and is adapted to store data and/or meta data reflecting the current status of the system under test, i.e. the status repository 130 forms the central data storage for all test blocks TB1-TBn. The test blocks are able to exchange data and/or metadata via said status repository 130, e.g. a first test block adds certain data and/or meta data to the status repository 130 and a subsequently executed test block reads said data for further actions.

Therefore, the status repository 130 may comprise a generic interface for the communication with the test block execution unit 120 allowing the executed test block to retrieve, store, and remove data form the status repository 130 in a standardized way. The test blocks may use the information provided to evaluate if pre-conditions are met for execution, may fetch data to be used as input parameters for execution, etc. During and after execution, the status repository 130 may be updated according to the results of execution. So, the structure of the actual information placed and read by test blocks might be specific to a certain subset or group of test blocks.

The status repository might also hold meta data only allowing test blocks to retrieve the actual status information directly from system under test SUT, e.g. references to allow fetching the real (live) data of the system under test SUT directly.

The system 100 may also comprise a history log unit 140. Since the test blocks will be performed in a stochastic order using dynamic and/or random input parameters, test system states and random content fetched from of the status repository 130, it may be advantageous to track and log data specifying the progress of system testing. Those data may be the test blocks which has been executed so far and the order of execution, the final execution states (success/failure) of all the test blocks executed so far, the input and output parameters of each executed test block and the state and characteristics of the system under test SUT before and after execution of a certain test block. In addition the history log unit 140 may comprise snapshot data of the status repository 130 before and after the execution of a certain test block. The logging may be triggered by the test block execution unit 120. Thereby it is possible to review the logged information in case of an error situation and investigate the reason of said error.

By accessing the data of the history log unit 140, it may also be possible to replay all performed test blocks in exact the same sequence and manner including exactly the same input parameters and properties at a later point of time as they were performed. Said replay capability is advantageous for reproducing a certain situation for trouble shooting or verification purposes. Preferably, said replay mode might be triggered by the test block execution unit 120 which might access the history log unit 140 in a read-only mode.

In the following the dynamic process of performing automated test on a system under test SUT based on system 100 is described by means of FIGS. 2-5. The process enables a random, dynamic selection and execution of test blocks TB1-TBn depending on the current status of the system under test SUT. The sequential arrangement of the test blocks is compiled ad-hoc in real-time based on expected but also unexpected behavior of the system under test SUT. Due to the state-based stochastic selection of test blocks TB1-TBn, the system 100 emulates the arbitrariness and unpredictability of a human interaction with the system under test SUT.

Figure 2:
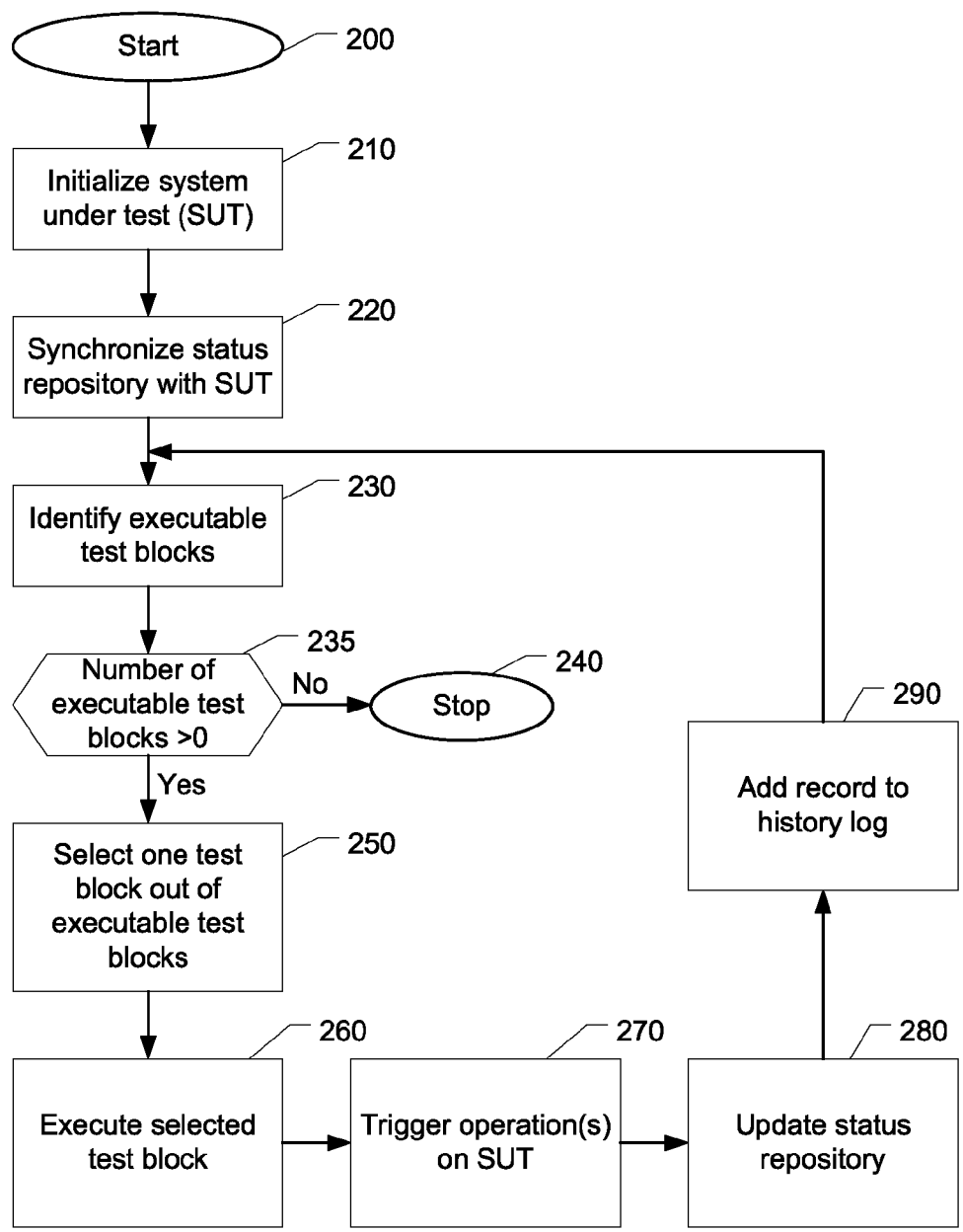
FIG. 2 shows a schematic flowchart of the automated test process according to the invention.

Referring to FIG. 2, after starting the system 100 (step 200), the system under test (SUT) is prepared for testing and preferable initialized (step 210). By initializing the system under test, a well-defined system state is reached. As mentioned above, there are no further initialization steps during the system test to explore the long-term behavior of the system under test SUT. Following up, the status repository 130 is synchronized with the actual status of the system under test (step 220), i.e. status parameter, e.g. variables, metadata etc. comprising the values of the system under test are transferred and stored within the status repository 130. After synchronization, the status repository 130 represents the current status of the system under test. Subsequently, the system under test is tested by means of a loop of steps 230-290, wherein during one loop cycle exactly one test block is executed. Because of the stochastic selection of the test block to be executed within the loop, an arbitrariness of the executed system test is reached, i.e. the system test is non-deterministic. Thereby system states and defects are uncovered which may not be detected by strictly deterministic test suites.

In the next step, the actual executable test blocks are identified (step 230). For providing a set of executable test blocks, a list containing all currently executable test blocks is generated. It is worth mentioning, that at a certain point of time not all available test blocks TB1-TBn can be executed. The ability of executing a certain test block mainly depends on the fulfillment of the pre-conditions of the respective test block. Said fulfillment is checked based on data stored in the status repository 130. The data stored in the status repository 130 may be updated or changed during each loop cycle. Thus, the set of executable test blocks also may change between subsequent loop cycles. Thereby additional randomness is generated.

Within step 235 it is checked if there is at least one executable test block available. If not, the system 100 stops and enters system state 'stalled' (step 240). Otherwise exactly one test block is selected out of the set of executable test blocks based on a statistical method (described later on)

(step 250). Said steps of identification and selection (steps 230-250) are preferable performed within the test block repository 100.

After selecting the test block to be executed, said test block is transmitted to the test block execution unit 120 and executed within said unit (step 260). Thereby the executed test block interacts with the system under test SUT and triggers one or multiple operations on the system under test SUT which may change the system status (step 270). For keeping the data of the status repository 130 up-to-date, said status repository 130 is updated based on the changed data or status of the system under test SUT (step 280). Preferably, the executed test block updates the status repository 130 with the resulting data of the triggered operation, respectively, the feedback the executed test block retrieves from the system under test SUT.

At the end of the loop the performed actions are logged. Thereby a record is added to the history log unit 140 including details regarding the input parameters of the executed test block, the corresponding results and the overall outcome of the executed operations (e.g. pass, fail, pass with warnings). Preferably, also snapshots regarding the status of the status repository 130 before and after the execution are performed.

After finishing the logging, the process starts again with step 230, i.e. identifying the test blocks being ready for execution.

Figure 3:
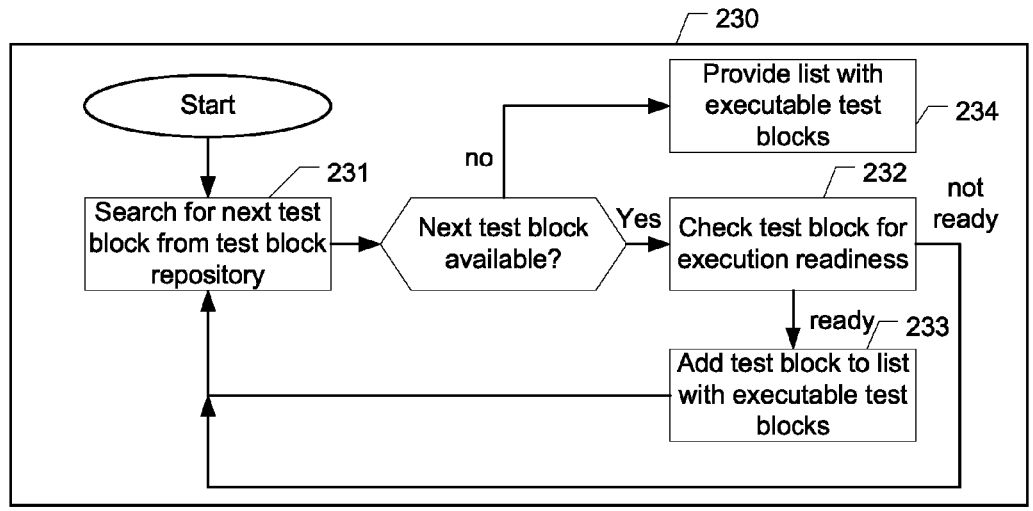
FIG. 3 shows a schematic flowchart of the step of identifying executable test blocks.

Referring to FIG. 3, step 230 of identifying executable test blocks is described in more detail. During the identification step, each test block TB1-TBn stored in the test block repository 110 is checked for its execution readiness. First, a test block to be checked is searched (step 231). If there is at least one unchecked test block, said test block is checked for execution readiness (step 232) which is described in detailed manner later on. If the explored test block is ready for execution, it is added to the list of executable test blocks (step 233), otherwise the next test block within the test block repository 110 is checked. The process starts again until all test blocks have been checked. At the end, a list containing all executable test blocks is provided (step 234).

Figure 4:
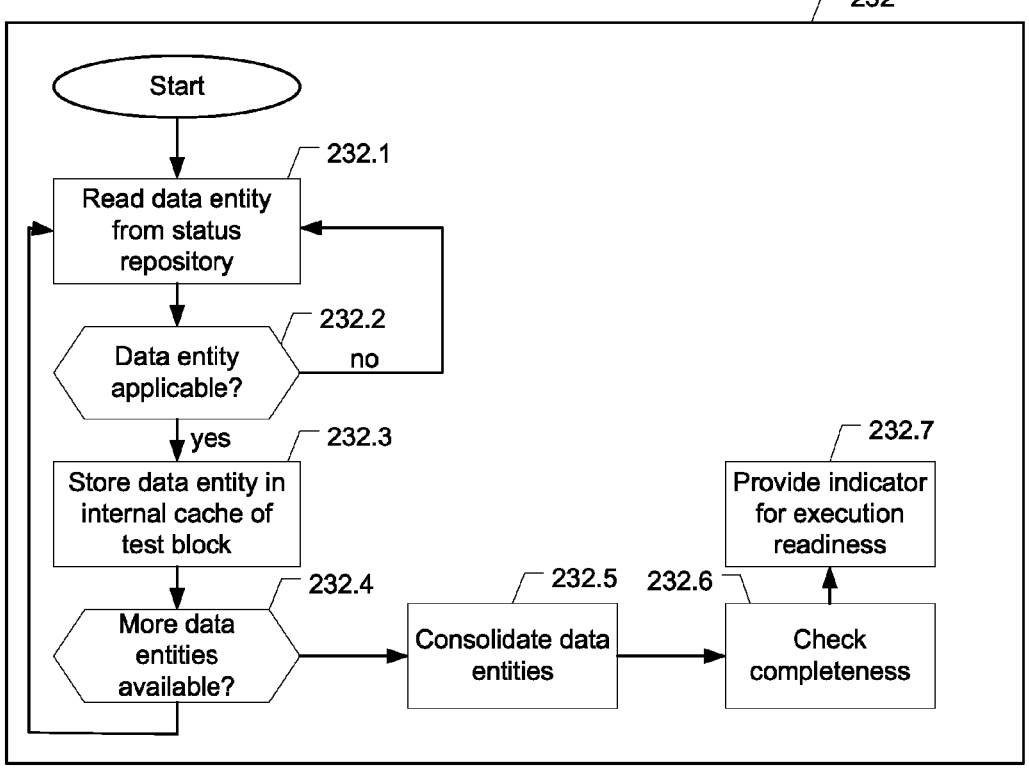
FIG. 4 shows a schematic flowchart of the step of checking execution readiness of the test blocks.

FIG. 4 shows in detail the process of checking a test block for execution readiness (step 232). In a first step, a data entity relevant for the current test block is read from the status repository 110 (step 232.1). Subsequently the applicability of the data entity is checked (step 232.2). If the data entity is applicable, it is stored within the internal cache of the test block (step 232.3) otherwise the next data entity is checked. The process is repeated until all data entities have been evaluated (step 232.4). Afterwards a consolidation of all cached data entities is performed (step 232.5). Thereby the redundant data entities are removed. Preferably there is a random selection of a certain data entity if multiple instances of said data entity with the same data type are available. Thereby additional randomness respectively arbitrariness is obtained. After consolidating, the cached data entities are checked for completeness, i.e. if it is possible to execute the test block based on said cached data (step 232.6) and an indicator is provided for indicating the execution readiness (step 232.7). Said indicator may be a Boolean variable.

Figure 5:
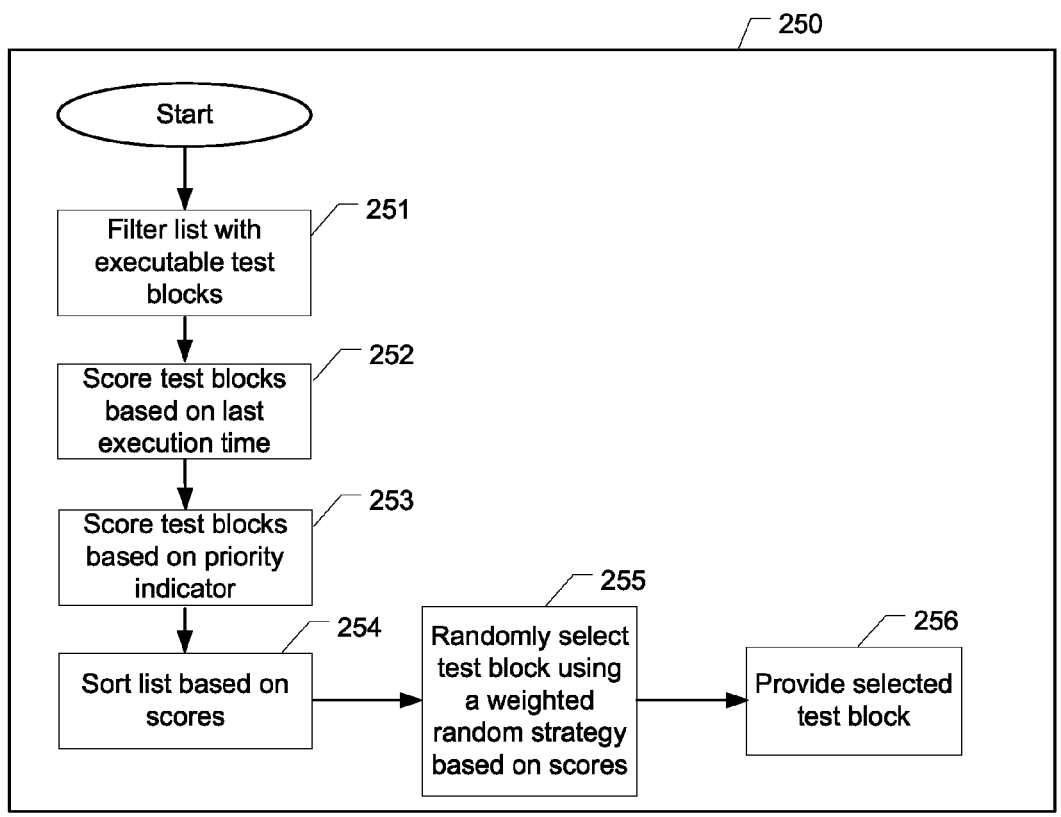
FIG. 5 shows a schematic flowchart of the step of selecting a test block out of a set of executable test blocks.

FIG. 5 shows in detail the process of selecting a certain test block to be executed out of the list of executable test blocks based on a weighted random strategy. In a first step, the list of executable test blocks is filtered to avoid that a test block executed directly before and failed will be executed once again (step 251). Thereby it is ensured that the same test block fails again and again without transferring the system under test SUT into a different system state.

After filtering, a scoring of the residual executable test blocks may be performed, i.e. the residual executable test blocks are ranked according to certain criteria. First the score of each candidate test block is initialized to score 0. According to a first scoring step, the test blocks are ranked according to their last execution time (step 252), wherein recently executed test blocks gets a lower score than those that have not been executed for a long period of time. There may follow a second scoring step based on priority or purpose indicators (step 253). As already described before, said indicators may specify at least one task with high priority or define a certain purpose or objective of the test block. Both scorings may have a certain weighting for adapting a prioritization of the respective scorings. Afterwards the list of executable test blocks may be sorted based on said scores (step 254). Subsequently, the test block to be executed is selected based on a weighted random strategy, wherein a test block with a higher score has a higher possibility to be selected than those with a lower score (step 255). It is worth mentioning, that in spite of scoring there is the possibility of all residual test blocks within the list to be selected. Only the likelihood of selection is different.

After selecting exactly one test block, said test block is provided to the test block execution unit 120 (step 256) for execution.

The invention claimed is:

1. A method for performing automated tests on a system under test, the method comprising the following steps:
providing a set of test blocks, with each test block of the set of test blocks being configured to trigger at least one user activity on the system under test;
providing a status repository containing data reflecting a current status of the system under test, wherein the set of test blocks are configured to retrieve, store and remove data from the status repository to facilitate an exchange of at least one parameter between at least two test blocks in the set of test blocks; and
providing a history log which protocols data regarding the performed automated tests including an identification of which test blocks in the set of test blocks have been executed and an order of execution thereof and therefore provides data necessary for tracing a test history of the system under test;
wherein the following set of steps is performed iteratively in order to execute a plurality of test blocks consecutively:
defining a subset of executable test blocks by evaluating preconditions mandatory for executing the test blocks based on the current status of the system under test;
scoring the executable test blocks based on at least one scoring parameter;
selecting a test block to be executed out of the subset of executable test blocks using a weighted random selection of the test block based on the scores, wherein a probability of selection of the test block depends on the score;
executing the selected test block, wherein due to the execution at least one action is triggered on the system under test;
updating data of the status repository based on data of the system under test provided by the executed test block; and
updating data of the history log by adding data regarding the executed test block, a status of the status repository and the results of the test block execution, including an identification of the executed test block and an order of execution of the executed test block, in order to enable repeating the automated tests starting at a certain status of the system under test.

2. The method according to claim 1, wherein the status of the status repository is read from the status repository prior to being stored in the history log and a change to the status repository caused by the executed test block is reconstructed using information from the history log.

3. The method according to claim 1, wherein a test scenario is built up by a set of self-contained test blocks, wherein the sequence of execution of the subset of executable test blocks is influenced by the current status of the system under test.

4. The method according to claim 3, wherein the sequence of test blocks to be executed is determined in real-time based on data of the status repository reflecting the status of the current system under test modified by the test block execution.

5. The method according to claim 1, wherein the test blocks are executed independently from each other if the preconditions mandatory for executing the test blocks are fulfilled.

6. A method for performing automated tests on a system under test, the method comprising the following steps:
  providing a set of test blocks, with each test block of the set of test blocks being configured to trigger at least one user activity on the system under test;
  providing a status repository containing data reflecting a current status of the system under test, wherein the set of test blocks are configured to retrieve, store and remove data from the status repository to facilitate an exchange of at least one parameter between at least two test blocks in the set of test blocks; and
  providing a history log which protocols data regarding the performed automated tests including an identification of which test blocks in the set of test blocks have been executed and an order of execution thereof and therefore provides data necessary for tracing a test history of the system under test;
  wherein the following set of steps is performed iteratively in order to execute a plurality of test blocks consecutively:
  defining a subset of executable test blocks by evaluating preconditions mandatory for executing the test blocks based on the current status of the system under test;
  scoring the executable test blocks based on at least one scoring parameter;
  selecting a test block to be executed out of the subset of executable test blocks by randomly selecting a test block based on the scores, wherein a probability of selection of a test block depends on the score;
  executing the selected test block, wherein due to the execution at least one action is triggered on the system under test;
  updating data of the status repository based on data of the system under test provided by the executed test block; and
  updating data of the history log by adding data regarding the executed test block, a status of the status repository and the results of the test block execution, including an identification of the executed test block and an order of execution of the executed test block, in order to enable repeating the automated tests starting at a certain status of the system under test, wherein the test blocks are associated with at least one weighting factor indicating a relative frequency of the user activity emulated by the test block, wherein the probability of selection of a test block is affected by the weighting factor.

7. The method according to claim 1, wherein after executing a test block the execution is validated using validation criteria associated with the executed test block.

8. The method according to claim 1, wherein the test blocks are adapted to validate themselves against success and failure criteria using validation criteria that are an integral part of each of the test blocks.

9. The method according to claim 7, wherein the result of the validation and a before and after state of the system under test is stored in the history log.

10. The method according to claim 1, wherein the set of test blocks is executed iteratively and cleanup or initialization steps are avoided between subsequent test blocks to enable the testing of long term effects.

11. The method according to claim 1, wherein the subset of executable test blocks is updated after each test block execution based on the updated data and/or metadata contained in the status repository such that an amount of executable test blocks is changed depending on a current state of the system under test.

12. The method according to claim 1, wherein the at least one scoring parameter comprises a first parameter associated with the period of time elapsed since the last execution of the test block and a second parameter associated with the test block specifying the priority of the test block.

13. A system for performing automated tests on a system under test, the system comprising:
  a data processor coupled to a memory having program code stored therein;
  a test block repository providing a set of test blocks, with each test block of the set of test blocks being configured to trigger at least one user activity on the system under test;
  a status repository containing data reflecting a current status of the system under test, wherein the set of test blocks are configured to retrieve, store and remove data from the status repository to facilitate an exchange of at least one parameter between at least two test blocks in the set of test blocks; and
  a history log adapted to protocol data regarding the performed automated tests including an identification of which test blocks in the set of test blocks have been executed and an order of execution thereof and therefore adapted for providing data necessary for tracing a test history of the system under test;
  wherein the program code is executable by the data processor to perform the following steps in order to execute a plurality of test blocks consecutively:
  defining a subset of executable test blocks by evaluating preconditions mandatory for executing the test blocks based on the current status of the system under test;
  scoring the executable test blocks based on at least one scoring parameter;
  selecting a test block to be executed out of the subset of executable test blocks using a weighted random selection of the test block based on the scores, wherein a probability of selection of the test block depends on the score;
  executing the selected test block, wherein due to the execution at least one action is triggered on the system under test;
  updating data of the status repository based on data of the system under test provided by the executed test block; and updating data of the history log by adding data regarding the executed test block, a status of the status repository and the results of the test block execution, including an identification of the executed test block and an order of execution of the executed test block, in order to enable repeating the automated tests starting at a certain status of the system under test.

14. A non-transitory computer-readable storage medium comprising computer-readable program code embodied therewith which, when executed by a processor, causes the processor to execute a method according to claim 1.

15. The system according to claim 13, wherein the test blocks are associated with at least one weighting factor indicating a relative frequency of the user activity emulated by the test block, wherein the probability of selection of a test block is affected by the weighting factor.

\* \* \* \* \*